(No Model.)

J. DEBORDE.
TIRE FOR VELOCIPEDES.

No. 585,929. Patented July 6, 1897.

INVENTOR
Julius Deborde

WITNESSES:

BY

ATTORNEYS.

UNITED STATES PATENT OFFICE.

JULIUS DEBORDE, OF HANOVER, GERMANY.

TIRE FOR VELOCIPEDES.

SPECIFICATION forming part of Letters Patent No. 585,929, dated July 6, 1897.

Application filed February 16, 1897. Serial No. 623,598. (No model.)

*To all whom it may concern:*

Be it known that I, JULIUS DEBORDE, a citizen of the Empire of Germany, residing at Hanover, in the Kingdom of Prussia, Germany, have invented certain new and useful Improvements in Tires for Velocipedes, of which the following is a specification.

This invention relates to certain improvements in tires for velocipedes, the object of which is to supply a serviceable substitute for the ordinary pneumatic tires, which are open to the objection of being readily punctured, whereupon the air contained in the tire escapes.

Other substitutes for pneumatic tires which have been used were open to objection on account of being considerably heavier and possessing much less elasticity than pneumatic tires.

The object of this invention is to furnish an improved tire by which the objections stated are effectually remedied, inasmuch as my improved tire has the advantage of maintaining its form and resiliency even when punctured in different places, as its filling mass cannot escape. On the other hand, my improved tire is as elastic and resilient as the ordinary pneumatic tire, while it exceeds the same only slightly in weight.

My invention consists of a tire for velocipedes composed of a hollow tube in which are arranged hollow balls of rubber or other elastic material which are connected by a suitable covering that is twisted intermediately between the balls, so as to form a string or chain connection for the same, said hollow balls being embedded in a yielding mass with which the surrounding space of the tire is filled.

Figure 1:
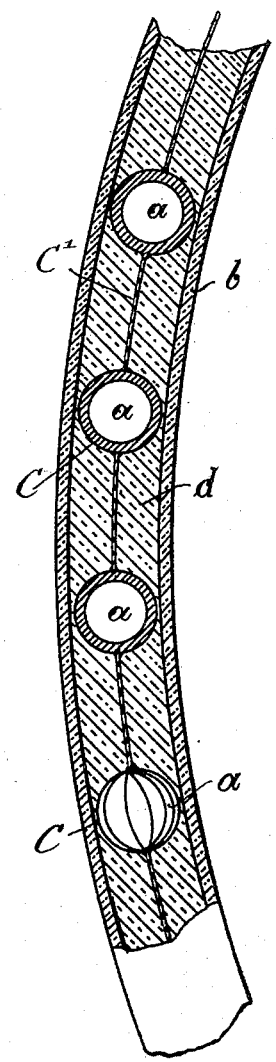
Figure 2:
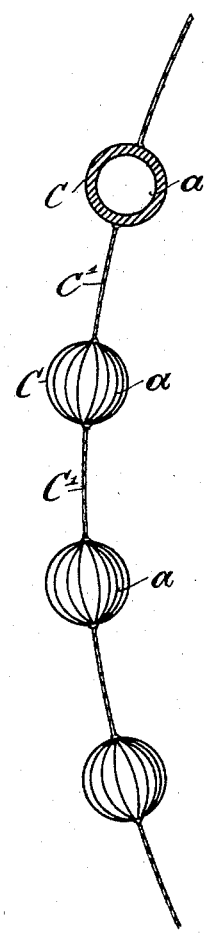

In the accompanying drawings, Figure 1 is a vertical longitudinal section of a portion of my improved tire, showing one form of the same. Fig. 2 is a side elevation of several individual balls, showing their connection so as to form a string or chain of balls, one of the balls being in section.

Similar letters of reference indicate corresponding parts.

In making my improved tire a number of hollow balls $a$, of rubber, cork, celluloid, or other suitable elastic material, are covered with a netting $C$, of cotton or other yarn, that is woven or knitted around the same and in which the covering is twisted between the balls, so as to form a so-called "string" or "chain" of balls, as shown in Fig. 2, $C'$ indicating the string-like connections. One or more of such strings or chain of balls are inserted into a tube $b$, made of several webs of rubber-coated fabric of any approved construction, while the space between the string or chain of balls and the tube is filled with a liquid gelatinous substance $d$, which is pumped under pressure into the tube. After the cooling and setting of the liquid filling a tire is obtained which is filled with connected hollow spheres and a surrounding gelatinous mass or filling. Any unequal distribution of the balls in the tire, which can hardly be avoided when loose balls are used, is obviated by the use of balls which are inclosed in a suitable manner and then connected so as to form a string or chain, as the distance of the individual balls from each other is determined by the twisted cord formed by the covering fabric of the balls.

The intervals between the balls may be greater or less, according to the degree of lightness and elasticity desired. For light or racing bicycles the rubber balls can be arranged at short distances from each other, while for heavier bicycles, such as tourists' bicycles, or for tricycles the intervals separating the balls may be greater. In order that the gelatinous mass may not become hard in cold or frosty weather, it is best to add to it glycerin or some other substance which acts in a similar manner. In addition to this it is also advisable to add some antiseptic ingredient, such as formaldehyde.

It is obvious that my improved tire can be made with different modifications without departing from the spirit of the invention. For instance, the rubber balls may be connected so as to form a string or chain of balls by first introducing them into thin woven tubes, in which a gut or the like is introduced at certain intervals, after which the tube is twisted so as to keep the balls in position, while the intermediate connecting-strings are reinforced by the gut. In place of rubber balls other substances or bodies may be employed, such as, for instance, balls of cork, celluloid, and the like. It is also possible to replace the yielding gelatinous mass referred to by other substances which surround the balls in an air-tight manner and retain their elasticity while in use.

Having thus described my invention, what I claim is—

1. A tire composed of a tube of suitable material, resilient balls arranged therein, connecting-strings between the balls, and a filling of yielding material in the space between the connected balls and the tube, substantially as set forth.

2. A tire composed of an exterior tube of suitable material, resilient balls within said tube connected by a suitable covering twisted into a string intermediate of the balls, to form a string or chain of balls, and a yielding filling mass in the tube, surrounding the string or chain of balls, substantially as set forth.

3. A tire consisting of an exterior tube of suitable material, a series of hollow resilient balls in the tube, said balls being connected by a suitable covering-web twisted into a string between the balls, and a yielding gelatinous filling mass in the space between the connected balls and the tube, substantially as set forth.

In testimony that I claim the foregoing as my invention I have signed my name in presence of two subscribing witnesses.

JULIUS DEBORDE.

Witnesses:
ERNST SCHMATOLKY,
W. HAUPT.